US011880224B2

(12) United States Patent
Kadam et al.

(10) Patent No.: US 11,880,224 B2
(45) Date of Patent: Jan. 23, 2024

(54) PROVIDING TAILORED SOFTWARE UPDATE RELEVANCE INFORMATION FOR DEPLOYED SOFTWARE

(71) Applicant: Cisco Technology, Inc., San Jose, CA (US)

(72) Inventors: Avaneesh Anandrao Kadam, San Jose, CA (US); Pratap Pereira, Saratoga, CA (US); Ravinandan Govinda Rao Arakali, San Jose, CA (US); Harshavardhan Parandekar, San Jose, CA (US); Vikram Guleria, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/183,554

(22) Filed: Feb. 24, 2021

(65) Prior Publication Data
US 2022/0269499 A1 Aug. 25, 2022

(51) Int. Cl.
G06F 8/65 (2018.01)
G06F 8/658 (2018.01)
G06F 11/36 (2006.01)

(52) U.S. Cl.
CPC ............ *G06F 8/658* (2018.02); *G06F 11/362* (2013.01)

(58) Field of Classification Search
CPC ... G06F 8/65; G06F 8/658; G06F 8/71; G06F 11/36; G06F 11/362; G06F 11/366
See application file for complete search history.

(56) References Cited

U.S. PATENT DOCUMENTS

| 7,873,956 B2 * | 1/2011 | Kim .......................... G06F 8/65 717/168 |
| 9,535,685 B1 | 1/2017 | Wang et al. |

(Continued)

FOREIGN PATENT DOCUMENTS

| EP | 2466454 A1 * | 6/2012 | ............... G06F 8/65 |
| KR | 102088164 B1 | 3/2020 | |

OTHER PUBLICATIONS

Thomas Rolfsnes et al., Predicting Relevance of Change Recommendations, IEEE, 2017, retrieved online on Mar. 25, 2022, pp. 691-704. Retrieved from the Internet: <URL: https://ieeexplore.ieee.org/stamp/stamp.jsp?tp=&arnumber=8115680>. (Year: 2017).*

(Continued)

*Primary Examiner* — Hanh Thi-Minh Bui
(74) *Attorney, Agent, or Firm* — Edell, Shapiro & Finnan, LLC (57) ABSTRACT

A recommendation system can be configured to provide tailored software update relevance information for deployed software. The recommendation engine can obtain running state information for a current version of software running on a device, as well as build data for each of the current version of the software and a new version of the software. The recommendation engine can obtain software version difference information based on the build data and determine, based on at least the software version difference information and the running state information, a number of functions in the current version of software that are directly impacted by the new version. The recommendation engine can cause relevance information derived from this determination to be displayed on a computing device, and/or the recommendation engine can automatically cause an update to the new version of the software to be applied or rejected based on the determination.

11 Claims, 7 Drawing Sheets

(56) References Cited

U.S. PATENT DOCUMENTS

| | | | |
|---|---|---|---|
| 2002/0184619 A1* | 12/2002 | Meyerson | G06F 21/51 |
| | | | 717/173 |
| 2006/0117310 A1 | 6/2006 | Daniels et al. | |
| 2009/0307650 A1 | 12/2009 | Saraf et al. | |
| 2010/0218178 A1* | 8/2010 | Sakai | H04N 1/00973 |
| | | | 717/173 |
| 2012/0110557 A1* | 5/2012 | Singh | G06F 11/368 |
| | | | 717/133 |
| 2019/0171432 A1 | 6/2019 | Miller et al. | |
| 2021/0124574 A1* | 4/2021 | Bainville | G06F 8/71 |

OTHER PUBLICATIONS

M. K. Ramanathan, A. Grama and S. Jagannathan, "Sieve: A Tool for Automatically Detecting Variations Across Program Versions," 21st IEEE/ACM International Conference on Automated Software Engineering (ASE'06), 2006, pp. 241-252, doi: 10.1109/ASE.2006.61. (Year: 2006).*

Reid Holmes and Robert J. Walker, Customized Awareness: Recommending Relevant External Change Events, 2010, ACM, retrieved online Sep. 8, 2023, pp. 465-473. Retrieved from the Internet: <URL: https://dl.acm.org/doi/pdf/10.1145/1806799.1806867>. (Year: 2010).*

Nucci, et al., "Quasi-Optimal Software Recommendation Analytics System (OPERA) for Network Devices," Technical Disclosure Commons, https://www.tdcommons.org/dpubs_series/1274, Jun. 21, 2018, 19 pages.

Cisco, "Cisco DNA Center 1.2.8 Training," Managing Device Software Images, Feb. 2019, 72 pages.

Microsoft Docs, "Update Applicability Rules," https://docs.microsoft.com/en-us/previous-versions/windows/desktop/bb902473(v=vs.85), Oct. 19, 2016, 8 pages.

Microsoft Docs, "Manage Applicability rules in Updates Publisher," Applicability rules—Configuration Manager, https://docs.microsoft.com/en-us/mem/configmgr/sum/tools/updates-publisher-applicability-rules, Apr. 29, 2017, 4 pages.

Jannetta, et al., "Fasttrack Recommender System," Technical Disclosure Commons, Nov. 19, 2020, https://www.tdcommons.org/dpubs_series/3788, 10 pages.

Bachwani, et al., "Mojave: A Recommendation System for Software Upgrades," http://www.cs.rutgers.edu/~rbachwan/mojave.pdf, Oct. 2012, 7 pages.

Solarwinds, "Patch Manager: Remote Desktop Patch Software," retrieved from https://www.solarwinds.com/patch-manager, on Feb. 15, 2021, 4 pages.

* cited by examiner

PROVIDING TAILORED SOFTWARE UPDATE RELEVANCE INFORMATION FOR DEPLOYED SOFTWARE

TECHNICAL FIELD

The present disclosure relates generally to software updates and, more particularly, to providing tailored software update relevance information for deployed software.

BACKGROUND

System administrators are tasked with keeping software up to date with available software updates. The updates can include major version updates or minor version updates. Major version updates typically include new features, workflows, and/or user interfaces, while minor version updates typically include bug fixes.

Installing a new software version generally requires system downtime or reduced functionality during the upgrade window. It also can include a risk of regressions. Accordingly, administrators do not want to apply every new software update that is made available.

DESCRIPTION OF EXAMPLE EMBODIMENTS

Overview

In an example embodiment, a recommendation system can be configured to provide tailored software update relevance information for deployed software. The recommendation system can obtain running state information for a current version of software running on a device, as well as build data for each of the current version of the software and a new version of the software. The recommendation system can compute or otherwise obtain software version difference information based on the build data and determine, based on at least the software version difference information and the running state information, a number of functions in the current version of software running on the device that are directly impacted by the new version. For example, the recommendation system can cause relevance information derived from this determination to be displayed on a computing device, and/or the recommendation system can automatically cause an update to the new version of the software to be applied or rejected based on the determination.

Example Embodiments

Presented herein are systems and methods for providing tailored software update relevance information for deployed software. The software can be deployed, e.g., on one or more computing devices. A recommendation system can determine a tailored relevance of the software update to the software as deployed on each respective computing device, i.e., per deployment. For example, the recommendation system can determine what part of the software is actually being exercised (used) at a particular deployment to determine whether changes in the new software version (as compared to the current software version) will be relevant to the particular deployment.

In an example embodiment, the recommendation system can obtain running state information for a current version of software deployed on a computing device. For example, the running state information can include function counter data and/or debug log data corresponding to the current version of the software. The function counter data can indicate, e.g., for each function of a set of functions in the deployed software, a number of times the function has been executed in the deployment. Similarly, the log counter data can indicate, for each debug log of a set of debug logs in the deployed software, a number of hits to the debug log in the deployment. Thus, the running state information can include information regarding a type and/or amount of activity "seen" in the deployment with respect to each function and/or debug log in the deployed software.

The recommendation system also can obtain build data for each of the current version of the software and the new version of the software. For example, for each of the current version of the software and the new version of the software, the build data can include function information, debug log information, and/or a call graph corresponding to the software. The recommendation system can compute or otherwise obtain software version difference information based on the build data. For example, the recommendation system can determine a contextual difference, which may include, e.g., a function difference set and/or a log difference set, based on the build data. Obtaining the function difference set can include, e.g., comparing the build data for the current version of the software with the build data for the new version of the software to identify function identifiers ("function IDs") corresponding to functions that are modified in the new version of the software from the current version of the software ("modified functions") and/or functions that are deleted in the new version of the software that existed in the current version ("deleted functions"). Obtaining the log difference set can include, e.g., identifying log identifiers ("log IDs") corresponding to debug log call sites from the current version of the software that are included in a sub-block of at least one of the modified functions.

The recommendation system can identify, e.g., based on the software version difference information, running state information, and/or build data, any functions directly impacted by the new version ("directly impacted functions"). For example, the directly impacted functions can include modified functions and/or deleted functions that have been actively executed in the deployment of the current version of the software. The recommendation system also may identify, e.g., based on the software version difference information, running state information, and/or build data, a number of first level caller functions of directly impacted functions in the new version and a number of second level caller functions of directly impacted functions in the new version. For example, the first level caller functions and the second level caller functions may include functions that do not constitute directly impacted functions but which call, either directly or indirectly (i.e., either in a first level or a second level) one or more directly impacted functions.

In an example embodiment, the recommendation system can compute relevance information, such as a relevance rating and/or relevance chart, which indicates a relevance of the software update to the deployment. For example, the relevance rating and/or chart can be computed based on a function of (a) a number of directly impacted functions, (b) a number of first level caller functions of directly impacted functions, and/or (c) a number of second level caller functions of directly impacted functions. The function can include, e.g., an average of these values, which may or may not be weighted (for example, using a Bayesian average formula or otherwise).

The recommendation system can cause the relevance rating and/or relevance chart (and/or other relevance related information) to be displayed on a computing device, e.g., for review by a system administrator. For example, a display of relevance information may assist the system administrator in determining whether a given update is applicable to a particular deployment and, if so, a degree of importance of the update to the deployment. The system administrator may use this information, e.g., to determine whether to apply or reject the software update. In addition, or in the alternative, the recommendation system can cause the software update to be applied or rejected based on the relevance information. For example, the recommendation system can cause the software update to be applied if the relevance rating is above a predetermined threshold and to be rejected if the relevance rating is below the predetermined threshold.

In an example embodiment, the recommendation system can be configured to mitigate against false positives and/or false negatives in the relevancy determination. For example, including the number of first level caller functions and/or the number of second level caller functions in the relevancy determination may mitigate against certain applicable functions from being incorrectly being considered irrelevant to the deployment (i.e., from being a false negative in the analysis), e.g., because they have not (yet) been exercised in the deployment. Similarly, false positives may be eliminated by pin-pointing an exact usage for a function identified as a modified function. For example, pin-pointing the exact usage may include determining whether the log difference set indicates that a change in a particular sub-block of at least one of the modified functions has an existing log, i.e., whether the particular sub-block has been executed in the deployment. Thus, the analysis may be refined to look more narrowly at a specific sub-block as opposed to an overall function. In addition, or in the alternative, a granularity of the analysis above with respect to the contextual difference may be adjusted to consider changes at the sub-block level.

Figure 1:
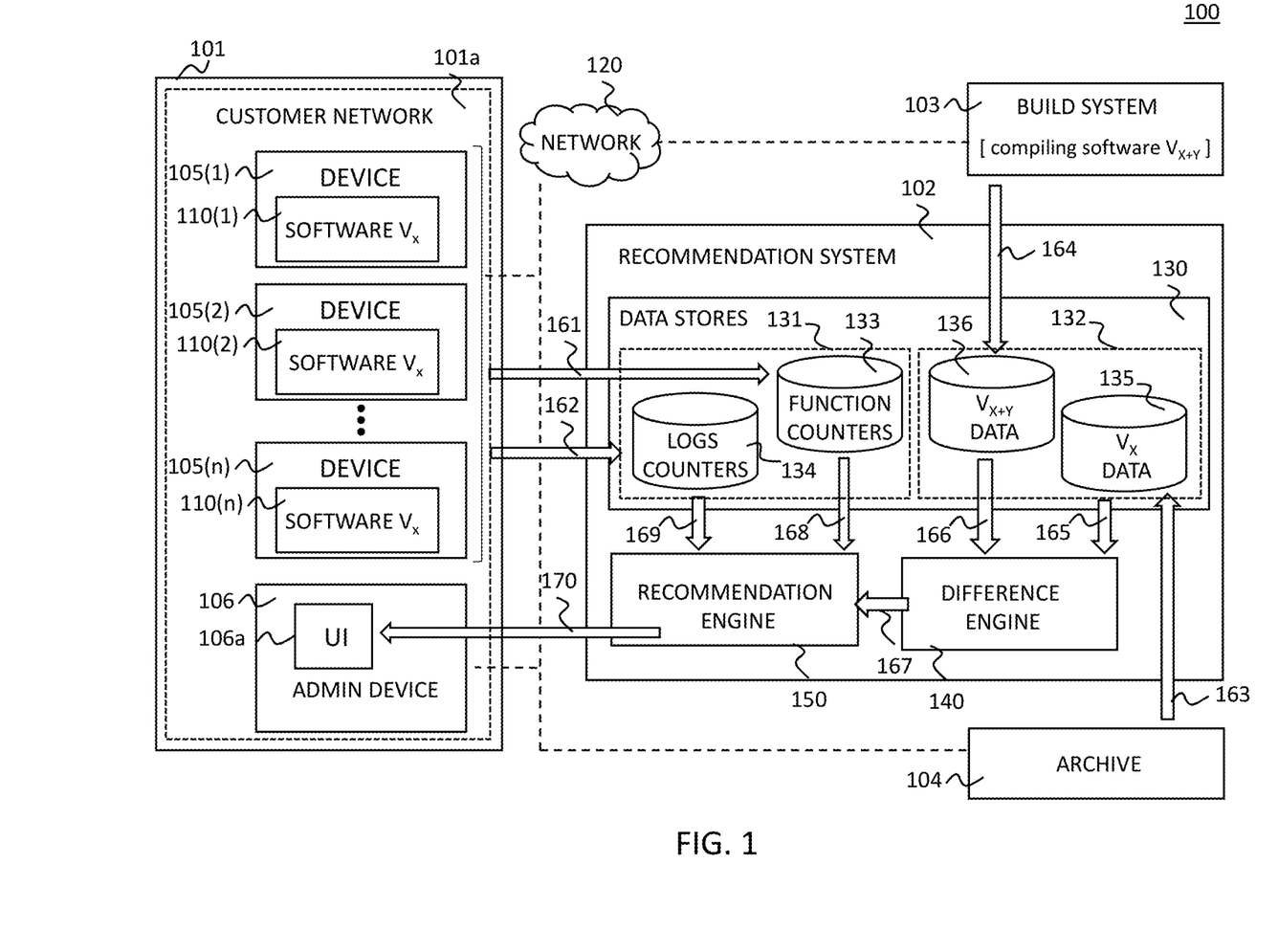
FIG. 1 is a diagram of a system for providing tailored software update relevance information for deployed software, according to an example embodiment.

Referring initially to FIG. 1, an example system 100 for providing tailored software update relevance information for deployed software can include a customer network 101a of a customer 101, a recommendation system 102, a build system 103, and an archive 104. The customer 101 may be a company or other entity. The customer network 101a includes multiple customer devices 105(1)-105(n) (collectively referred to as "customer devices 105") and an administrator device 106 configured to operate within the customer network 101a. Each of the customer devices 105 and the administrator device 106 includes a computer or processing system, such as (but not limited to) network switches, network routers, gateways, firewalls, a desktop computer, video conference equipment, laptop computer, tablet, phone, server computer, storage devices, or other mobile or non-mobile device. Each of the customer devices 105 and the administrator device 106 may (or may not) include, for example, one or more types of displays (e.g., a screen or monitor, which may display a user interface 106a) and/or input devices (e.g., a keyboard, mouse, voice recognition, etc.) to enter and/or view information.

Each of the customer devices 105(1)-105(n) includes a memory that stores instructions for software 110(1)-110(n), respectively, executed by a processor of the customer device. The software 110(1)-110(n) is collectively referred to as "software 110" herein, for simplicity. A version of the software 110, namely, version "x", can be (but does not necessarily have to be) the same across the customer devices 105. Moreover, the software 110(i) running on a given customer device 105(i) may be different across the customer devices 105. The administrator device 106 is configured to monitor and manage operations for the customer devices 105, including operation of the software 110, on behalf of the customer 101. For example, a systems administrator of the customer 101 can operate the administrator (admin) device 106 to oversee performance of the customer devices 105 and any software deployed to, or queued for potential distribution (e.g., by the systems administrator) to, the customer devices 105, including the software 110.

The customer devices 105 and administrator device 106 are configured to communicate with one another and/or one or more systems and devices, which may be internal or external to the customer network 101a, such as the recommendation system 102, build system 103, and archive 104, via a network 120. The network 120 includes any communications medium for transmitting information between two or more computing devices. For example, the network 120 can include a local area network (LAN), wide area network (WAN), virtual private network (VPN), Intranet, Internet, hardwire connections, modem connections, wireless connections, or combinations of one or more these items.

The recommendation system 102 is a computer or processing system, such as (but not limited to) a desktop, laptop, tablet, phone, server, or other mobile or non-mobile device, which includes data stores 130, a difference engine 140, and a recommendation engine 150. The data stores 130 include any data storage structure (e.g., one or more files, databases, data structures, data or other repositories, etc.) configured to store information. In particular, the data stores 130 include running state information 131 and build data 132.

The running state information 131 generally includes information regarding how and to what degree different functions and debug logs of the software 110 are being used in one or more respective software deployments. In an example embodiment, the running state information 131 includes one or more function counters 133 and one or more log counters 134. The function counters 133 indicate, for each function of a set of functions in each of one or more items of software, a number of times the function has been executed. For example, the function counters 133 can include, for each of the customer devices 105, or a set of one or more of the customer devices 105 (e.g., all or a portion of the customer devices 105), a count of the number of times each function of a set of functions in the software 110 has been executed. The function counters 133 can use any mechanism for identifying, and counting execution of, the functions. For example, the function counters 133 can include a table, list, or other mechanism that associates an identifier for each function (a function ID) with a corresponding numerical count. An example row of such a table or list may have a format, such as: "source : func_name : count"-->"ROOT/wlc/client/client_admit.o : perform_admission_control : 2982". However, it should be appreciated that the data may be stored in any suitable format.

The log counters 134 indicate, for each debug log of a set of debug logs in each of one or more items of software, a number of hits to the debug log. For example, the log counters 134 can include, for each of the customer devices 105, or a set of one or more of the customer devices 105 (e.g., all or a portion of the customer devices 105), a count of the number of hits to each debug lug of a set of debug logs in the software 110. In this context, a "hit" may include any call to a debug log, regardless of whether the debug log executed an output to a log target (e.g., because of a runtime setting or filter). The log counters 134 can use any mechanism for identifying, and counting hits to, the debug logs. For example, the log counters 134 can include a table, list, or other mechanism that associates an identifier for each debug log (a log ID) with a corresponding numerical count. An example row of such a table or list may have a format, such as: "LUID : count"-->"9bf4776510b22ca0b124-f07c2cf7468d : 8311". However, it should be appreciated that the data may be stored in any suitable format.

The function counters 133 and log counters 134 can be computed using any mechanism now known or hereinafter developed for tracking execution of, and/or calls to, a software function and/or debug log. For example, the function counters 133 and log counters 134 may be computed using a lightweight, "always on", or selectively tuned on, debugging technique for tracking software system activity. The debugging technique may involve, e.g., a debugging operation executed as a matter of course each time a function, debug log, or memory access is called or executed, with a result of the debugging operation populating or advancing one or more corresponding counters.

In an example embodiment, the customer network 101a can provide the running state information 131 to the recommendation system 102. For example, as shown generally at 161 and 162, each of the customer devices 105 can provide function count and log count information for the function counters 133 and log counters 134, respectively. In addition, or in the alternative, the administrator device 106 can collect and/or aggregate the running state information 131 for provision to the recommendation system 102.

As may be appreciated, different deployments can use a same item of software 110 in different ways. For example, there can be different deployments of a same item of software 110 within the customer network 101a, including, e.g., a first deployment involving a first subset of the devices 105 and a second deployment involving a second subset of the devices. In addition, or in the alternative, there can be different deployments of a same item of software 110 across multiple different customer networks. The recommendation system 102 can be configured to collect and maintain running state information 131 for each of one or more different deployments of the software 110. Thus, the recommendation system 102 can include tailored running state information 131 for each of multiple different software deployments.

The build data 132 includes build information, such as function IDs for each function, log IDs for each debug log call site, and/or a call graph representing a function fan-in fan-out, for each of a first, current version of a software, referred to as "$V_x$ data" 135 and a second, new version of the software, referred to as "$V_{x+y}$ data" 136. In particular, the $V_x$ data 135 includes build data corresponding to a (current) version of the software 110 on the devices 105, and the $V_{x+y}$ data 136 includes build data corresponding to a new version of the software 110 corresponding to a software update, which has not (yet) been installed on the devices 105. The new version can be, e.g., a first, second, or another (minor or major) version release of the software 110 other than the current version of the software 110. Note that, in the context of the software versions, the term "new" is used herein to indicate that a particular version of software is different from a current version of the software; a software version may be considered "new" regardless of whether it is released before, after, or at a same time as the current version of the software. The build data 132 (and each of the $V_x$ data 135 and $V_{x+y}$ data 136) can be stored in any format, such as one or more tables, lists, or other mechanisms for storing information. For example, the build data 132 can, e.g., include a hash of content for each function ID, such as "source : func_name: hash"-->"ROOT/wlc/client/client_admit.o : perform_admission_control : <hash>".

In an example embodiment, the recommendation system 102 can obtain the build data 132 from the build system 103 and the archive 104. For example, as shown generally at 163, the archive 104 can provide build information for the $V_x$ data 135, and, as shown generally at 164, the build system 103 can provide build information for the $V_{x+y}$ data 136. The build system 103 is a computing process, device, and/or storage mechanism configured to obtain the $V_{x+y}$ data 136. For example, the build system 103 can be configured to compile, build, or otherwise analyze the software 110 and/or an update to the software 110 to determine the $V_{x+y}$ data 136. The archive 104 is a computing process, device, and/or storage mechanism configured to obtain the $V_x$ data 135. For example, the archive 104 can be configured to backup, receive, or otherwise obtain the build data from the build system 103, e.g., upon deployment of the software 110 to the devices 105.

In an example embodiment, the difference engine 140 is configured to obtain information from the $V_x$ data 135 (as shown generally at 165) and information from the $V_{x+y}$ data 136 (as shown generally at 166) and compare the obtained information to identify one or more differences (sometimes called "contextual differences") between the current version of the software 110 and the new version of the software. For example, the difference engine 140 can use the $V_x$ data 135 to identify a hash of each function of the current version of the software (a "current version hash"), use the $V_{x+y}$ data 136 to identify a hash of each function of the new version of the software (a "new version hash"), and compare the current version hash and new version hash to derive a "function difference set" of function IDs for (a) functions that are modified in the new version from the current version (i.e., modified functions), and (b) functions that are deleted in the new version that exist in the current version (i.e., deleted functions). For example, the function difference set may include information such as: "source : func_name: modified/deleted flag"-->"ROOT/wlc/client/client_admit.o : admission_control_win7_ws : modified" "ROOT/wlc/client/client_roam.o : roampolicy_cache_create : deleted". . . . As may be appreciated, this information, and the format of the information, is illustrative; more, less, or different information, which may be formatted in any of a variety of different formats, can be included in the function difference set as appropriate. The difference engine 140 also may be configured to use the information from the $V_x$ data 135 and the information from the $V_{x+y}$ data 136 to derive or otherwise obtain a "log difference set" including log IDs from the current version of the software that are in a sub-block (e.g., if/else/while/for) of a modified function. For example, the log difference set can be used to narrow a granularity of relevance information derived for the software update, as described in more detail below.

The recommendation engine 150 is configured to obtain the software version difference information, i.e., the function difference set and/or log difference set, from the difference engine 140, as shown generally at 167. The recommendation engine 150 also can obtain running state information 131, including information from the function counters 133 (function counter information) and information from the log counters 134 (log counter information), from the data stores 130, as shown generally at 168 and 169, respectively. The recommendation engine 150 can correlate the software version difference information with the running state information 131 to determine whether any functions and/or debug logs that are changed (e.g., modified or deleted) in the new version of the software are in use (e.g., as an executed function and/or a debug log, which has been hit) in deployment. For example, the recommendation engine 150 can identify one or more functions as "directly impacted functions" if they include modified functions and/or deleted functions that have been actively executed in the deployment of the current version of the software 110.

A number of directly impacted functions may be indicative of a relevancy of a new software version to a particular deployment. For example, a new software version for which a relatively high number of directly impacted functions have been identified for a particular deployment may have a greater potential impact on—and therefore may be more relevant to—the particular deployment, than a new software version for which a relatively low number of (or zero) directly impacted functions have been identified. It should be appreciated, though, that changes involving functions, which are not directly impacted functions, also may be relevant to the deployment. For example, a changed function may be applicable to a particular deployment but not identified as a directly impacted function by the recommendation engine 150 because it has not yet been executed in the deployment; the changed function may be expected, e.g., to be executed in the future. Take, for example, a wireless LAN controller that performs admission control checks depending on a type of client connecting to a network. If a function is associated with a particular client type, and the particular client type has not been seen by the customer network 101a yet, the function may not have been exercised. However, if a new version of software fixes that function, the fix can still be useful in case the particular client type attempts to join the customer network 101a in the future.

The recommendation engine 150 can be configured to account for these types of functions when determining relevancy of a software update by identifying any first level caller functions and/or second level caller functions associated with any directly impacted functions. For example, the recommendation engine 150 can review call graph data (from the build data 132) and running state information 131 to see if any first level caller functions or second level caller functions associated with any modified functions have been executed in the deployment. Following the example above, assume that a function "admission_control_win7_ws( )" is fixed in a new version of software. The recommendation engine 150 can determine that this modified function is not executed in a current deployment (e.g., based on the state information 131). However, the recommendation engine 150 can use the call graph data from the build data 132 to identify any first level callers or second level callers for this function in the software. For example, another function—"perform_admission_control( )"—may be a first level caller of the function "admission_control_win7_ws( )".

The recommendation engine 150 can be configured to provide tailored relevancy information regarding the software update based on this information. For example, the recommendation engine 150 can be configured to compute a relevance rating (R) for the software update on a deployment by deployment basis based on a function of a number of directly impacted functions (d), a number of first level caller functions of directly impacted functions (i1), and/or a number of second level caller functions of directly impacted functions (i2). The function can include, e.g., an average of the R, i1, and i2 values, which may or may not be weighted. For example, the relevance rating can be computed as a simple average as follows: R=f(d, i1, i2), where 0<=R=n and n is a real number (e.g., ten, though n could be any suitable value above or below ten).

Alternatively, the relevance rating can include a weighted average, such as a Bayesian average rating: R=(W0*d+W1*i1+W2*i2)/(d+i1+i2), where W0, W1, and W2 are different weights given to each variable. For example, variable d may be given a stronger weightage than variable i1 and variable i2 since variable d can be a direct indicator of applicability of a software update to a current deployment (as it corresponds to a directly impacted function), while variables i1 and i2 can be indirect indicators (as they correspond to functions that call directly impacted functions and not to directly impacted functions themselves). Similarly, variable i1 may be given a stronger weightage than variable i2 since it correlates to first level caller functions, which may be more directly applicable to the deployment than the second level caller functions correlated to variable i2. For example, the weights may be allocated as follows: W0: 10; W1: 2; W2: 1; and an example relevance rating R for a particular software update where d=10000, i1=500, and i2=1700, is 8.41. It should be appreciated that the weights and formulas presented herein are illustrative and can vary (or be omitted as appropriate).

In an example embodiment, the recommendation engine 150 can be further configured to adjust a granularity of the relevance rating analysis as appropriate to pin-point a level of impact for a particular software update. For example, if a function counter analysis indicates that a function is a directly impacted function, it may be advantageous for the recommendation engine 150 to determine a scope of usage for the function, to better understand a potential impact of the change to the function. As an example, even if a particular function is directly impacted by a software update, a relative relevance of the software update may be relatively low if the particular function is large and/or complex and the software update only modifies a specific sub-block of the function (e.g., a particular if( )/switch( ) case).

The recommendation engine 150 can consider this level of granularity, for example, by comparing the running state information 131 against the log difference set computed by the difference engine 140 to see whether a change in a specific sub-block has an existing debug log, and, if the specific sub-block has an existing debug log, whether that exact sub-block has been executed. The relevance rating and/or information regarding the relevance rating may be adjusted as appropriate based on this pin-pointed analysis. In addition, or in the alternative, counters akin to the function counters 133 and log counters 134 may be included at the sub-block level to provide for a finer granularity of usage information with which to determine potential software update relevance. For example, the relevance rating logic described above could be adjusted to include a (weighted or unweighted) number of impacted sub-blocks, either in addition to, or in lieu, of the numbers of directly impacted functions, the number of first level caller functions, and/or the number of second level caller functions.

As shown generally at 170, the recommendation engine 150 can be configured to provide relevance information, including, e.g., the relevance rating, one or more charts related to the relevancy of the software update, etc., to be provided to the administrative device 106. The recommendation engine 150 can be configured, e.g., to cause the relevance rating and/or one or more charts to be displayed to a system administrator, e.g., via the user interface 106a of the administrator device 106. For example, the system administrator can use this information to determine whether to deploy the software update to one or more of the devices 105. Example screenshots of the user interface 106a are described in more detail below, with reference to FIGS. 2-4. In addition, or in the alternative, the recommendation engine 150 can be configured to cause the software update to be applied or rejected to one or more of the devices 105 based on the relevance rating. For example, the recommendation engine can cause the software update to be applied if the relevance rating is above a predetermined threshold and to be rejected if the relevance rating is below the predetermined threshold.

Though depicted in FIG. 1 as being located external to the customer network 101a, it should be recognized that one or more of recommendation system 102, build system 103, and/or archive 104, may be included within the customer network 101a in alternative example embodiments. Moreover, though illustrated in FIG. 1 as discrete components, it should be appreciated that the customer network 101a, recommendation system 102, build system 103, and/or archive 104 may be integrated or otherwise reconfigured in any number of different components without departing from the spirit and scope of the embodiments presented herein. For example, at least certain of the features and/or functionality of the customer network 101a, recommendation system 102, build system 103, and/or archive 104 may be integrated into a single entity, and/or certain of the features and/or functionality described herein in connection with a particular entity (e.g., the customer network 101a, recommendation system 102, build system 103, and/or archive 104) may be included in, and/or performed by, one or more of the other entities.

Figure 2:
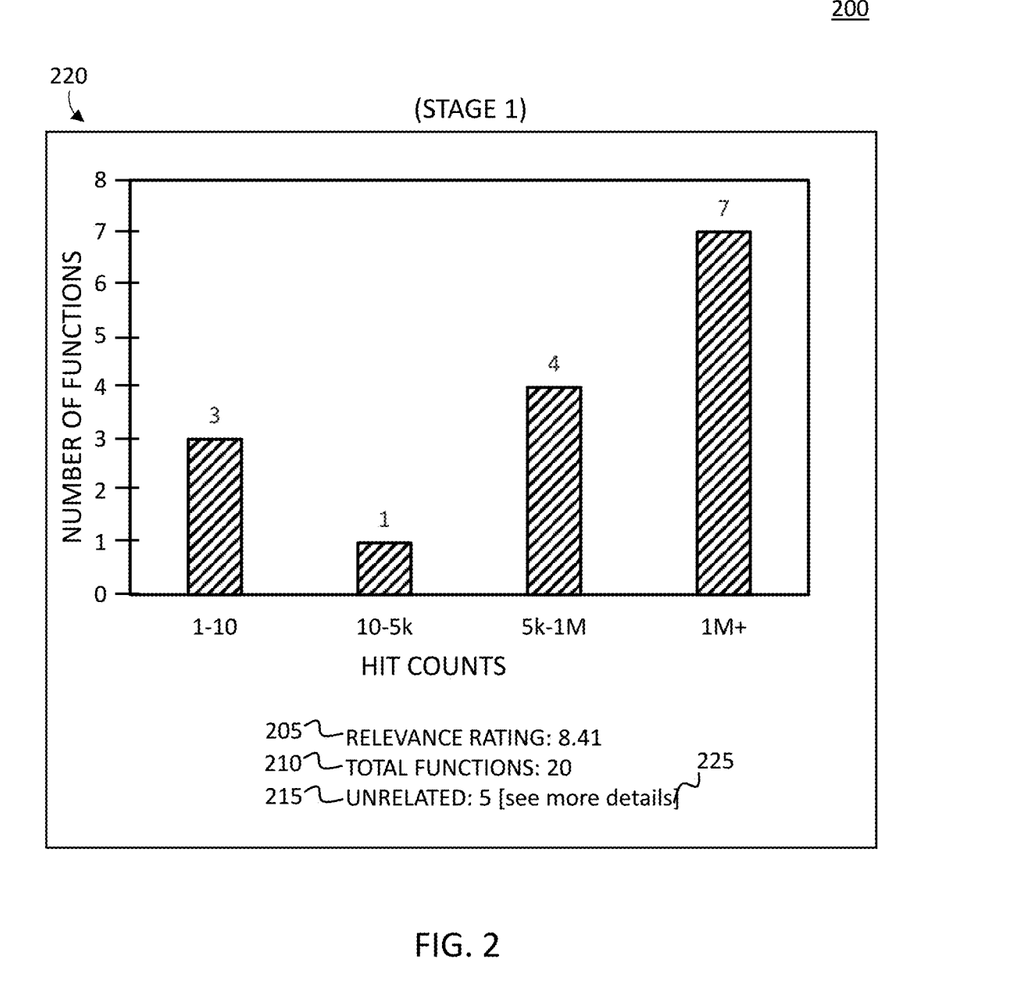
FIG. 2 is an example screenshot of a user interface displayed in connection with a first stage of providing tailored software update relevance information for deployed software, according to an example embodiment.

FIG. 2 is an example screenshot of a user interface 200 displayed in connection with a first stage—"Stage 1"—of providing tailored software update relevance information for deployed software, according to an example embodiment. For example, a recommendation system (e.g., the recommendation system 102 described above in connection with FIG. 1) can cause the user interface 200 to be displayed to a systems administrator via an administrator device (e.g., the administrator device 106 described above in connection with FIG. 1). The systems administrator can, e.g., use the user interface 200 to evaluate whether to install an update to software that has been deployed on one or more computing devices within the purview of the systems administrator.

The user interface 200 includes a snapshot view of tailored information regarding the software update and a potential impact of the software update on the deployed software. In particular, the user interface 200 includes a relevance rating 205, which provides a numerical indication, on a scale of one to ten (though any scale could be used) regarding a degree to which the update may be relevant to the deployed software. A relatively high value for the relevance rating 205 could indicate, e.g., that the update is highly relevant to the deployed software and, therefore, should be accepted. Similarly, a relatively low value for the relevance rating 205 could indicate that the update is not particularly relevant to the deployed software and, therefore, should be rejected. In the example depicted in FIG. 2, the relevance rating 205 is 8.41.

The user interface 200 includes additional detailed information corresponding to, and potentially informing, the relevance rating 205. For example, the user interface includes a "total functions" field 210 indicating a total number of functions that are changed between a current version of the software and a new version of the software. The total functions field 210 may correspond, for example, to the function difference set described above with reference to the difference engine 140 in FIG. 1. An "unrelated" functions field 215 indicates a number of the total functions that have not been executed in the deployment. For example, the unrelated functions field 215 can be computed by the recommendation system by correlating function IDs for the total functions against running state information for the deployed software, such as one or more function counters and/or log counters, as described above with reference to FIG. 1.

A chart 220 specifies a hit count for each of the total functions that are not "unrelated" to the deployment, i.e., a hit count for each of the functions that has been executed in the deployment at least once. In the example depicted in FIG. 2, the chart 220 indicates that, of the twenty total functions that have been modified by the software update, fifteen of the functions have been executed in the deployment at least once. Of these fifteen functions, three functions were hit 1-10 times, one function was hit 10-5 k times, four functions were hit 5 k-1M times, and seven functions were hit more than 1M times. Thus, the chart 220 provides a summary indication to the system administrator regarding a potential impact the software update may have to various different functions of the current deployment.

In an example embodiment, the systems administrator may activate a link 225 to obtain more information regarding the unrelated functions field 215. For example, the systems administrator may activate the link 225 to look for any false negative cases in the count of unrelated functions, e.g., for functions that have not yet been hit in the deployment (and therefore are not included in the chart 220) but may be expected to be hit in the future.

Figure 3:
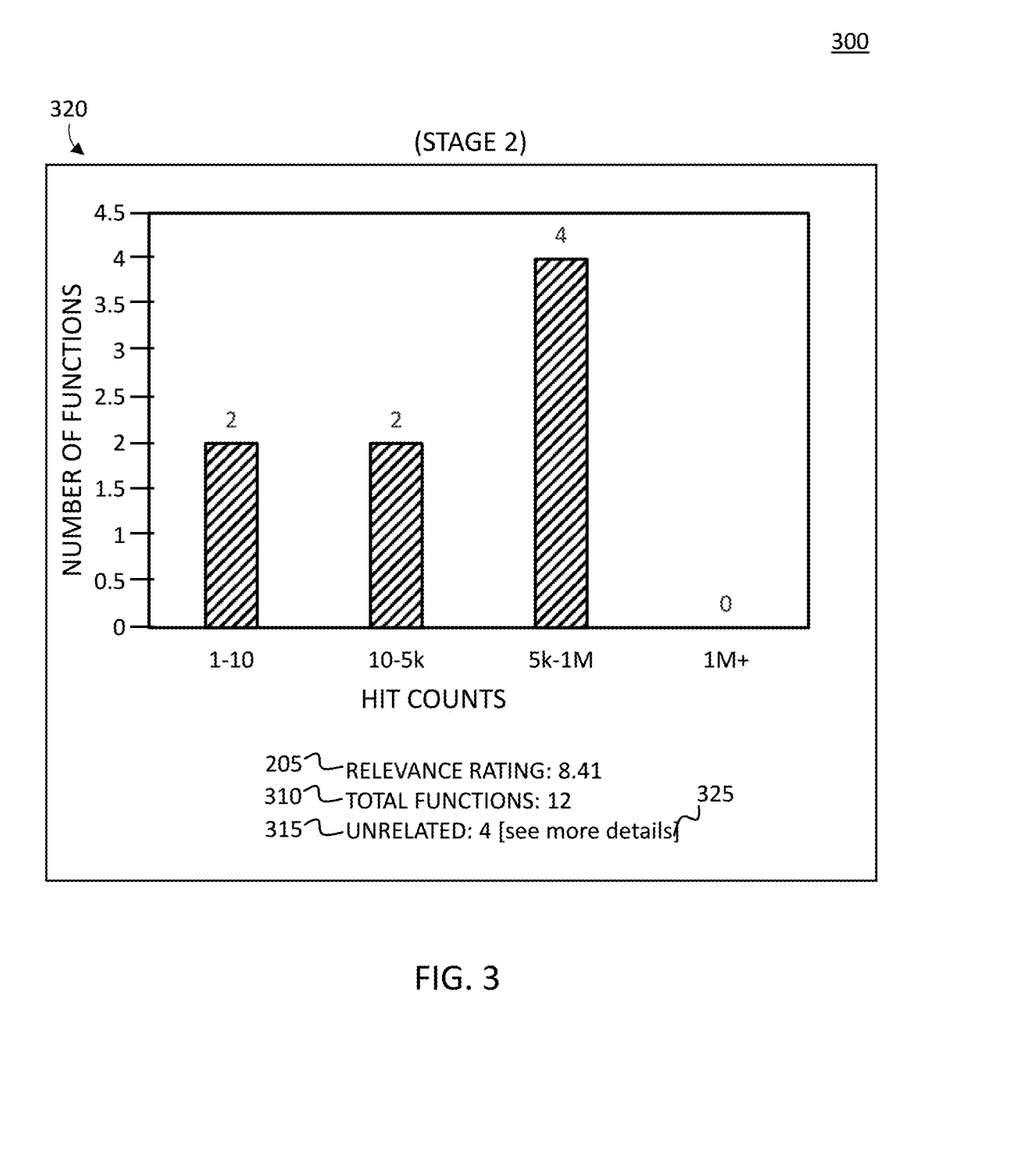
FIG. 3 is an example screenshot of a user interface displayed in connection with a second stage of providing tailored software update relevance information for deployed software, according to an example embodiment.

FIG. 3 is an example screenshot of a user interface 300, which may be displayed in response to activation of the link 225 (e.g., in a "Stage 2" of providing tailored software update relevance information for deployed software), according to an example embodiment. The user interface 300 includes the relevance rating 205, as well as a "total functions" field 310 and an "unrelated" functions field 315. The total function field 310 includes a total number of first caller level functions corresponding to the "unrelated" functions identified in connection with the user interface 200. The "unrelated" functions field 315 indicates a number of the total (first caller level) functions that have not been executed in the deployment. In the example depicted in FIG. 3, the total function field 310 indicates that the five unrelated functions identified in Stage 1 are called from a total of twelve first level caller functions, while the unrelated functions field 315 indicates that four of these first level caller functions have not been executed in the deployment.

A chart 320 specifies a hit count for each of the first level caller functions that has been executed in the deployment at least once. In the example depicted in FIG. 3, the chart 320 indicates that, of the twelve total first level caller functions, eight of the functions have been executed in the deployment at least once. Of these eight functions, two functions were hit 1-10 times, two functions were hit 10-5 k times, and four functions were hit 5 k-1M times.

Figure 4:
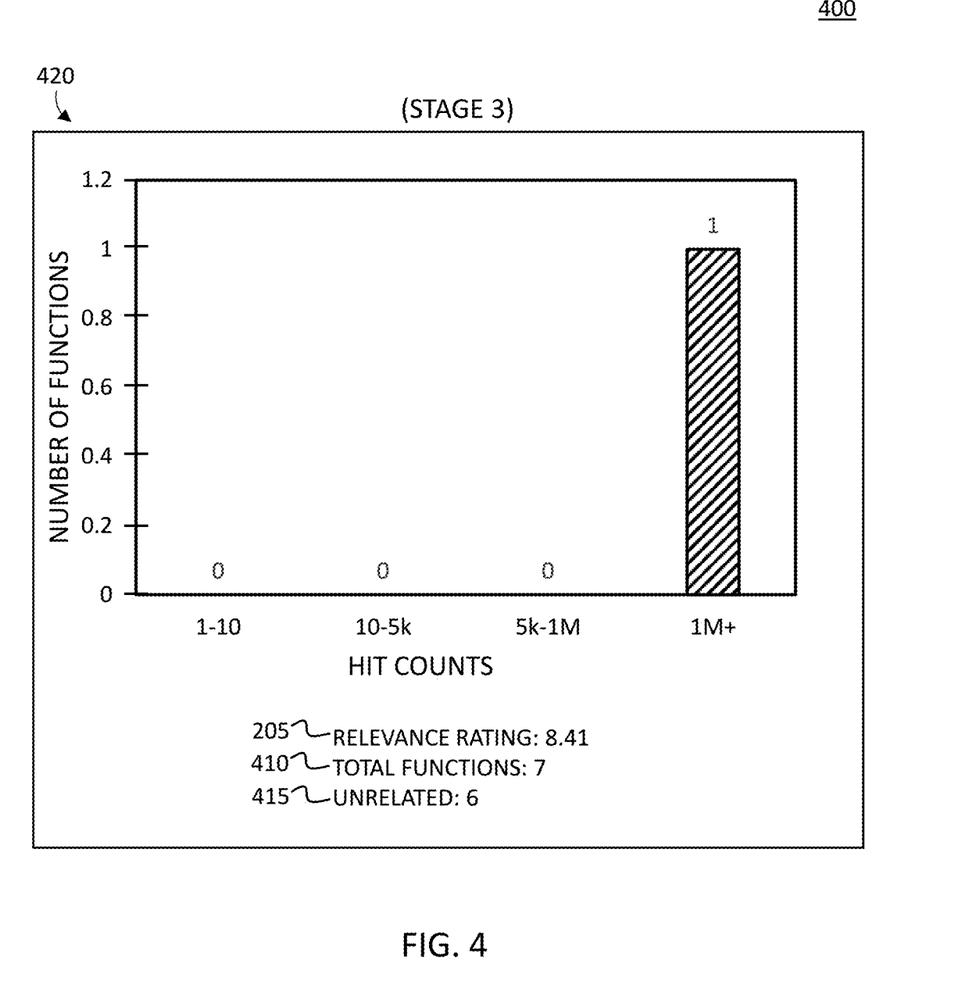
FIG. 4 is an example screenshot of a user interface displayed in connection with a third stage of providing tailored software update relevance information for deployed software, according to an example embodiment.

The systems administrator may activate a link 325 to obtain more information regarding the unrelated functions field 315. FIG. 4 is an example screenshot of a user interface 400, which may be displayed in response to activation of the link 325 (e.g., in a "Stage 3" of providing tailored software update relevance information for deployed software), according to an example embodiment. The user interface 400 includes the relevance rating 205, as well as a "total functions" field 410 and an "unrelated" field 415.

The total function field 410 includes a total number of second caller level functions corresponding to either the "unrelated" functions identified in connection with the user interface 200 or the "unrelated" functions identified in connection with the user interface 300. The "unrelated" field 415 indicates a number of the total (second caller level) functions that have not been executed in the deployment. In the example depicted in FIG. 4, the total function field 410 indicates that unrelated functions identified in Stage 1 and/or Stage 2 are called from a total of seven second level caller functions, while the unrelated field 415 indicates that six of these second level caller functions have not been executed in the deployment. A chart 420 specifies a hit count for each of the second level caller functions that has been executed in the deployment at least once. In the example depicted in FIG. 4, the chart 420 indicates that, of the seven total second level caller functions, one of the functions has been executed in the deployment a total of 1M+ times.

As may be appreciated, the user interfaces 200, 300, and 400 depicted in FIGS. 2-4, respectively, are illustrative and can vary in alternative example embodiments. Relevance information for a particular software update and/or deployment can be provided in any of a variety of different formats, which may or may not include a numerical relevance rating, a relevance chart, etc. Moreover, while the examples depicted in FIGS. 2-4 may be particularly useful for an embodiment wherein bug fixes are the primary criteria for assessing relevance of a software update, it should be appreciated many other types of analyses, such as feature impact analysis, can be performed using some or all of the techniques described above. For example, the recommendation system (e.g., in the recommendation engine) can be configured to identify a type of analysis to be performed with respect to a particular software update (e.g., a bug fix analysis vs. a feature impact analysis, etc.) and then configure corresponding recommendation logic and display settings accordingly. A feature impact analysis may include, for example, providing a system administrator with an indication regarding how many, and by what degree, features the customer is using will be impacted by the newer software version. For example, one or more of the user interfaces 200, 300, and 400 may be modified to accommodate a feature impact analysis by including counts and/or detailed information regarding directly impacted functions, first level caller functions of directly impacted functions, and/or second level caller functions of directly impacted functions.

Figure 5:
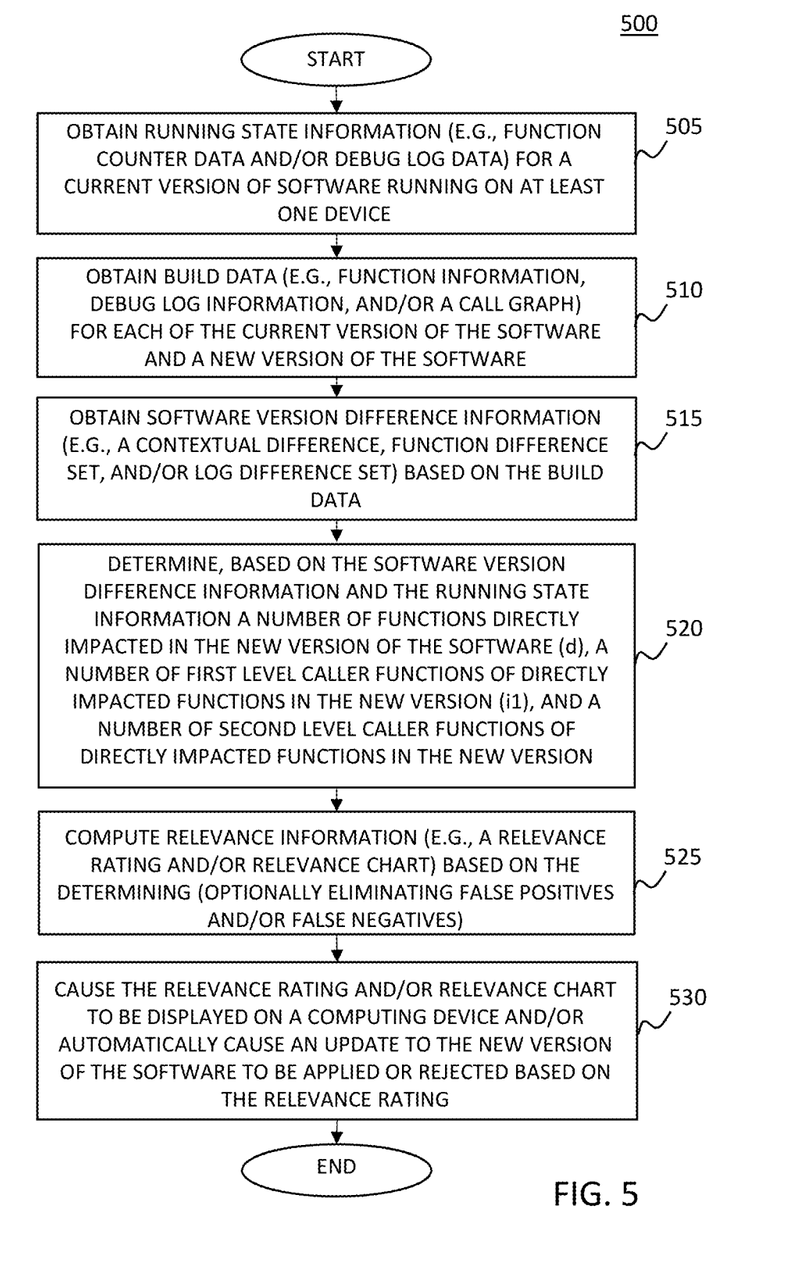
FIG. 5 is a flow chart of a method for providing tailored software update relevance information for deployed software, according to an example embodiment.

FIG. 5 is a flow chart of a method 500 for providing tailored software update relevance information for deployed software, according to an example embodiment. In step 505, a recommendation system obtains running state information for a current version of software running on at least one computing device. For example, the running state information can include function counter data and/or debug log data corresponding to a deployment of the current version of the software on the computing device(s). The recommendation system may obtain the running state information, e.g., from the computing device(s) and/or an administrator device corresponding to the computing device(s).

In step 510, the recommendation system obtains build data for each of the current version of the software and a new version of the software. The new version of the software can, e.g., correspond to a software update being considered for deployment to the computing device(s). The build data can include, e.g., function information, debug log information, and/or a call graph corresponding to the software.

In step 515, the recommendation system obtains software version difference information based on the build data. For example, the recommendation system can compute or otherwise obtain the software version difference information by comparing the build data for the current version of the software and the build data for the new version of the software. The software version different information can include, e.g., contextual difference information, such as a function difference set and/or a log difference set. The function difference set can include, e.g., function IDs corresponding to any functions modified in the new version of the software from the current version of the software (i.e., modified functions) and/or functions that are deleted in the new version of the software that existed in the current version (i.e., deleted functions). The log difference set can include, e.g., log IDs corresponding to debug log call sites from the current version of the software that are included in a sub-block of at least one of the modified functions.

In step 520, the recommendation system, determines, based on the software version difference information and the running state information, a number of functions directly impacted in the new version of the software (i.e., directly impacted functions). For example, the directly impacted functions can include modified functions and/or deleted functions that have been actively executed in the deployment of the current version of the software. The recommendation system also determines, based on the software version difference information and the running state information, a number of first level caller functions of directly impacted functions in the new version and a number of second level caller functions of directly impacted functions in the new version. For example, the first level caller functions and the second level caller functions may include functions that do not constitute directly impacted functions but which call, either directly or indirectly (i.e., either in a first level or a second level) one or more directly impacted functions.

In step 525, the recommendation system computes relevance information based on the determination in step 520. For example, the relevance information can include a relevance rating and/or a relevance chart with information indicating a relevance of the software update to the deployment. The relevance rating and/or chart can be computed, e.g., based on a function of (a) a number of directly impacted functions, (b) a number of first level caller functions of directly impacted functions, and/or (c) a number of second level caller functions of directly impacted functions. The function can include, e.g., an average of these values, which may or may not be weighted (for example, using a Bayesian average formula or otherwise).

In step 530, the recommendation system causes the relevance rating and/or relevance chart (and/or other relevance related information) to be displayed on a computing device, e.g., for review by a system administrator. For example, a display of relevance information may assist the system administrator in determining whether a given update is applicable to a particular deployment and, if so, a degree of importance of the update to the deployment. The system administrator may use this information, e.g., to determine whether to apply or reject the software update. In addition, or in the alternative, the recommendation engine can cause the software update to be applied or rejected based on the relevance information. For example, the recommendation engine can cause the software update to be applied if the relevance rating is above a predetermined threshold and to be rejected if the relevance rating is below the predetermined threshold.

Figure 6:
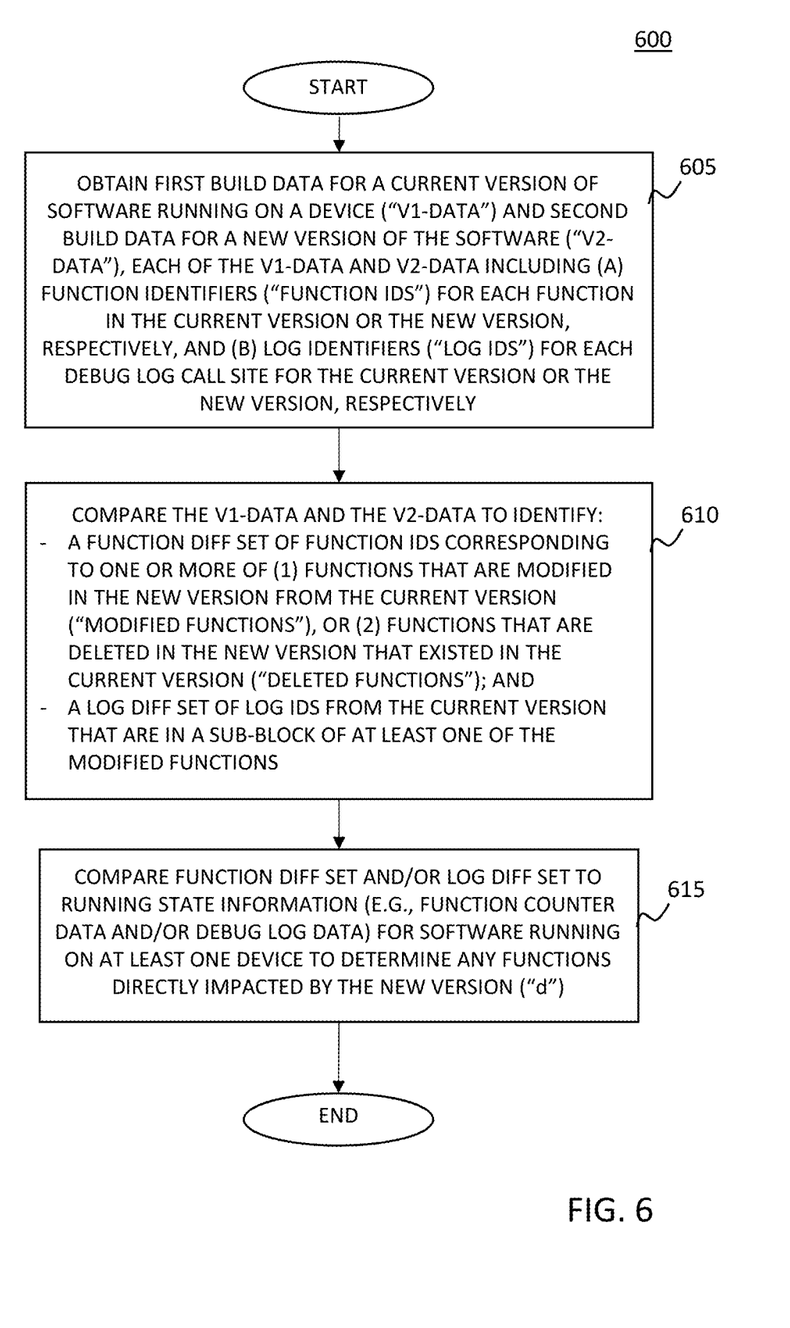
FIG. 6 is a flow chart of a method for determining functions of a deployed software that are directly impacted by a software update, according to an example embodiment.

FIG. 6 is a flow chart of a method 600 for determining functions of a deployed software that are directly impacted by a software update, according to an example embodiment. In step 605, a recommendation system obtains first build data for a current version of software running on a computing device ("V1-DATA") and second build data for a new version of the software ("V2-DATA"). The V1-DATA includes function IDs for each function, and Log IDs for each debug log call site for, the current version of the software. The V2-DATA includes function IDs for each function, and Log IDs for each debug log call site for, the new version of the software.

In step 610, the recommendation system compares the V1-DATA and the V2-DATA to identify a function difference set and a log difference set. The function difference set includes a set of function IDs corresponding to one or more of modified functions, and/or deleted functions. The log difference set includes a set of log IDs from the current version of the software that are in a sub-block of at least one of the modified functions.

In step 615, the recommendation system compares the function difference set and/or log difference set to running state information for software running on at least one device, e.g., a current version of the software deployed on a computing device. The running state information includes function data, such as a function counter indicating, for each function of a set of functions in the deployed software, a number of times the function has been executed in the deployment. The running state information also may include debug log data, such as a log counter indicating, for each debug log of a set of debug logs in the deployed software, a number of hits to the debug log in the deployment. Based on this comparison, the recommendation system can determine any functions in the current version of the deployed software that would be directly impacted by the new version of the software (if a software update to the new version was deployed). For example, a function may be directly impacted if it is a modified function or deleted function, which has been executed in the deployment.

As would be recognized by a person of skill in the art, the steps associated with the methods of the present disclosure, including method 500 and method 600, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 7:
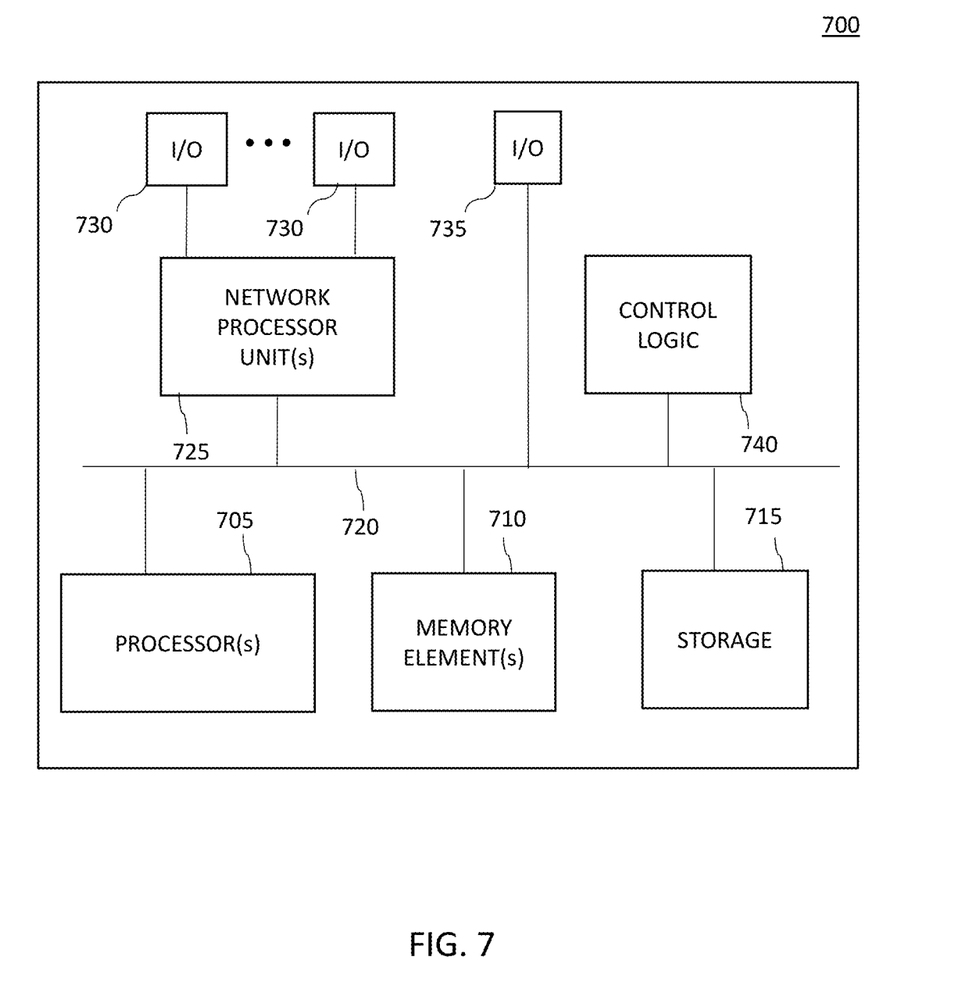
FIG. 7 is a hardware block diagram of a computing device that may perform functions associated with any combination of operations, in connection with the techniques depicted in FIGS. 1-6, according to an example embodiment.

Referring to FIG. 7, FIG. 7 illustrates a hardware block diagram of a computing device 700 that may perform functions associated with operations discussed herein in connection with the techniques depicted in FIGS. 1-6. In various example embodiments, a computing device, such as computing device 700 or any combination of computing devices 700, may be configured as any entity/entities as discussed for the techniques depicted in connection with FIGS. 1-6, such as the customer network 101a, device 105, administrator device 106, recommendation system 102, build system 103, archive 104, recommendation engine 150, and/or difference engine 140, or one or more of the modules or other components thereof, in order to perform operations of the various techniques discussed herein.

In at least one embodiment, computing device 700 may include one or more processor(s) 705, one or more memory element(s) 710, storage 715, a bus 720, one or more network processor unit(s) 725 interconnected with one or more network input/output (I/O) interface(s) 730, one or more I/O interface(s) 735, and control logic 740. In various embodiments, instructions associated with logic for computing device 700 can overlap in any manner and are not limited to the specific allocation of instructions and/or operations described herein.

In at least one embodiment, processor(s) 705 is/are at least one hardware processor configured to execute various tasks, operations and/or functions for computing device 700 as described herein according to software and/or instructions configured for computing device. Processor(s) 705 (e.g., a hardware processor) can execute any type of instructions associated with data to achieve the operations detailed herein. In one example, processor(s) 705 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 710 and/or storage 715 is/are configured to store data, information, software, and/or instructions associated with computing device 700, and/or logic configured for memory element(s) 710 and/or storage 715. For example, any logic described herein (e.g., control logic 740) can, in various embodiments, be stored for computing device 700 using any combination of memory element(s) 710 and/or storage 715. Note that in some embodiments, storage 715 can be consolidated with memory element(s) 710 (or vice versa), or can overlap/exist in any other suitable manner.

In at least one embodiment, bus 720 can be configured as an interface that enables one or more elements of computing device 700 to communicate in order to exchange information and/or data. Bus 720 can be implemented with any architecture designed for passing control, data and/or information between processors, memory elements/storage, peripheral devices, and/or any other hardware and/or software components that may be configured for computing device 700. In at least one embodiment, bus 720 may be implemented as a fast kernel-hosted interconnect, potentially using shared memory between processes (e.g., logic), which can enable efficient communication paths between the processes.

In various embodiments, network processor unit(s) 725 may enable communication between computing device 700 and other systems, entities, etc., via network I/O interface(s) 730 to facilitate operations discussed for various embodiments described herein. In various embodiments, network processor unit(s) 725 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 730 can be configured as one or more Ethernet port(s), Fibre Channel ports, and/or any other I/O port(s) now known or hereafter developed. Thus, the network processor unit(s) 725 and/or network I/O interfaces 730 may include suitable interfaces for receiving, transmitting, and/or otherwise communicating data and/or information in a network environment.

I/O interface(s) 735 allow for input and output of data and/or information with other entities that may be connected to computer device 700. For example, I/O interface(s) 735 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 740 can include instructions that, when executed, cause processor(s) 705 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 740) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 710 and/or storage 715 can store data, software, code, instructions (e.g., processor instructions), logic, parameters, combinations thereof, and/or the like used for operations described herein. This includes memory element(s) 710 and/or storage 715 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes obtaining running state information for a current version of software running on a device; obtaining build data for each of the current version of the software and a new version of the software; obtaining software version difference information based on the build data; and determining, based on the software version difference information and the running state information, a number of functions in the current version of software running on the device that are directly impacted by the new version of the software. Obtaining the software version difference information can include, e.g., comparing the build data to identify a function difference set comprising a function identifier for at least one function modified in the new version of the software from the current version of software running on the device. Determining the number of functions in the current version of software running on the device that are directly impacted by the new version can include, e.g., comparing the running state information to the function difference set. In addition, or in the alternative, obtaining the software version difference information can include determining a log difference set, and determining the number of functions can further include comparing the running state information against the log difference set to determine whether a change to a particular one of the functions has an existing debug log, which has been executed for the current version of the software.

A relevance rating can be determined for a software update corresponding to the new version of the software based on at least the number of functions in the current version of software running on the device that are directly impacted by the new version of the software. In an example embodiment, a number of first level callers of the functions directly impacted by the new version can be determined based on the software version difference information and the build data. Determining the relevance rating for the software update corresponding to the new version of the software can be based, e.g., on a function of at least the number of functions in the current version of software running on the device that are directly impacted by the new version of the software, and the number of first level callers of the functions directly impacted by the new version. In addition, or in the alternative, a number of second level callers of the functions directly impacted by the new version can be determined based on the software version difference information and the build data. Determining the relevance rating for the software update corresponding to the new version of the software can be based, e.g., on a function of at least the number of functions in the current version of software running on the device that are directly impacted by the new version of the software, the number of first level callers of the functions directly impacted by the new version, and the number of second level callers of the functions directly impacted by the new version.

In an example embodiment, the relevance rating can be displayed on a computing device. In addition, or in the alternative, an update to the new version of the software can automatically be applied or rejected based on the determining of the number of functions in the current version of software running on the device that are directly impacted by the new version of the software.

In another form, an apparatus comprises one or more memories configured to store data and one or more processors coupled to the memory and configured to perform operations including: obtaining running state information for a current version of software running on a device; obtaining build data for each of the current version of the software and a new version of the software; obtaining software version difference information based on the build data; and determining, based on the software version difference information and the running state information, a number of functions in the current version of software running on the device that are directly impacted by the new version of the software.

In another form, one or more non-transitory computer readable storage media include instructions that, when executed by at least one processor, are operable to: obtain running state information for a current version of software running on a device; obtain build data for each of the current version of the software and a new version of the software; obtain software version difference information based on the build data; and determine, based on the software version difference information and the running state information, a number of functions in the current version of software running on the device that are directly impacted by the new version of the software.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   obtaining running state information for a current version of software running on a device;
   obtaining build data for each of the current version of the software and a new version of the software;
   obtaining software version difference information based on the build data;
   determining, based on the software version difference information, the build data, and the running state information, a number of functions in the current version of software running on the device that are directly impacted by the new version of the software, a number of first level callers that call the functions directly impacted by the new version of software, and a number of second level callers of functions directly impacted by the new version of software;
   determining a relevance rating for a software update corresponding to the new version of the software based on a function of at least the number of functions in the current version of software running on the device that are directly impacted by the new version of the software, based on the number of first level callers that call the functions directly impacted by the new version of the software, and based on the number of second level callers of functions directly impacted by the new version of software;
   displaying on a computing device a representation of the relevance rating and the number of functions in the current version of software running on the device that are directly impacted by the new version of the software; and
   automatically causing an update to the new version of the software to be applied or rejected based on the determining the relevance rating.

2. The computer-implemented method of claim 1, wherein obtaining the software version difference information comprises comparing the build data to identify a function difference set comprising a function identifier for at least one function modified in the new version of the software from the current version of software running on the device.

3. The computer-implemented method of claim 2, wherein determining the number of functions in the current version of software running on the device that are directly impacted by the new version comprises comparing the running state information to the function difference set.

4. The computer-implemented method of claim 1, further comprising causing the relevance rating to be displayed on a computing device.

5. The computer-implemented method of claim 1, wherein obtaining the software version difference information comprises determining a log difference set, and determining the number of functions further comprises comparing the running state information against the log difference set to determine whether a change to a particular one of the functions has an existing debug log, which has been executed for the current version of the software.

6. An apparatus comprising:
   one or more memories configured to store data; and
   one or more processors coupled to the memory and configured to perform operations including:
   obtaining running state information for a current version of software running on a device;
   obtaining build data for each of the current version of the software and a new version of the software;
   obtaining software version difference information based on the build data;
   determining, based on the software version difference information, the build data, and the running state information, a number of functions in the current version of software running on the device that are directly impacted by the new version of the software, a number of first level callers that call the functions directly impacted by the new version of software, and a number of second level callers of functions directly impacted by the new version of software;
   determining a relevance rating for a software update corresponding to the new version of the software based on a function of at least the number of functions in the current version of software running on the device that are directly impacted by the new version of the software, based on the number of first level callers that call the functions directly impacted by the new version of the software, and based on the number of second level callers of functions directly impacted by the new version of software; and
   automatically causing an update to the new version of the software to be applied or rejected based on the determining the relevance rating.

7. The apparatus of claim 6, wherein the one or more processors are further configured to obtain the software version difference information by comparing the build data to identify a function difference set comprising a function identifier for at least one function modified in the new version of the software from the current version of software running on the device.

8. The apparatus of claim 7, wherein the one or more processors are further configured to determine the number of functions in the current version of software running on the device that are directly impacted by the new version by comparing the running state information to the function difference set.

9. One or more non-transitory computer readable storage media comprising instructions that, when executed by at least one processor, are operable to:
- obtain running state information for a current version of software running on a device;
- obtain build data for each of the current version of the software and a new version of the software;
- obtain software version difference information based on the build data;
- determine, based on the software version difference information, the build data, and the running state information, a number of functions in the current version of software running on the device that are directly impacted by the new version of the software, a number of first level callers that call the functions directly impacted by the new version of software, and a number of second level callers of functions directly impacted by the new version of software; and
- determine a relevance rating for a software update corresponding to the new version of the software based on a function of at least the number of functions in the current version of software running on the device that are directly impacted by the new version of the software, based on the number of first level callers that call the functions directly impacted by the new version of the software, and based on the number of second level callers of functions directly impacted by the new version of software; and
- automatically cause an update to the new version of the software to be applied or rejected based on the determining the relevance rating.

10. The one or more non-transitory computer readable storage media of claim 9, wherein the instructions, when executed by at least one processor, are further operable to obtain the software version difference information by comparing the build data to identify a function difference set comprising a function identifier for at least one function modified in the new version of the software from the current version of software running on the device.

11. The one or more non-transitory computer readable storage media of claim 10, wherein the instructions, when executed by at least one processor, are further operable to determine the number of functions in the current version of software running on the device that are directly impacted by the new version by comparing the running state information to the function difference set.

* * * * *